United States Patent [19]

Takata et al.

[11] Patent Number: 4,766,972
[45] Date of Patent: Aug. 30, 1988

[54] WHEEL SPIN CONTROL APPARATUS FOR USE IN AN AUTOMOBILE

[75] Inventors: Koji Takata; Hideaki Fujioka, both of Itami, Japan

[73] Assignee: Sumitomo Electric Industries, Ltd., Osaka, Japan

[21] Appl. No.: 113,156

[22] Filed: Oct. 27, 1987

[30] Foreign Application Priority Data

Oct. 30, 1986 [JP] Japan .................. 61-258867

[51] Int. Cl.$^4$ .................. B60K 31/00; B60T 8/10
[52] U.S. Cl. .................. 180/197; 303/100; 364/426
[58] Field of Search .................. 180/197; 303/100; 364/426

[56] References Cited

U.S. PATENT DOCUMENTS

| | | |
|---|---|---|
| 3,169,595 | 2/1965 | Shepherd .................. 180/197 |
| 3,680,655 | 8/1972 | Beyerlein et al. .................. 180/197 |
| 3,779,331 | 12/1973 | Burckhardt et al. .................. 180/197 |
| 3,802,529 | 4/1974 | Burkhardt et al. .................. 180/197 |
| 4,484,280 | 11/1984 | Brugger et al. .................. 364/426 |
| 4,583,611 | 4/1986 | Frank et al. .................. 180/197 |
| 4,625,824 | 12/1986 | Leiber et al. .................. 180/197 |

FOREIGN PATENT DOCUMENTS 58-16948 1/1983 Japan .
62-60937 3/1987 Japan .

*Primary Examiner*—John A. Pekar
*Attorney, Agent, or Firm*—Cushman, Darby & Cushman

[57] ABSTRACT

A wheel spin control apparatus for use in an automotive vehicle having left- and right-hand driven wheels includes spin detectors for detecting the occurrence of an excessive wheel spin in the left- and right-hand driven wheels, and braking controllers for applying braking forces to the left- and right-hand driven wheels in response to the detection of the excessive wheel spins to suppress the excessive wheel spin, and thereafter gradually weakening the braking forces. The wheel spin control apparatus further includes a torque controller for controlling an output power of an engine employed to drive the left- and right-hand driven wheels such that the engine output power is gradually decreased as at least one of the braking forces is gradually weakened, whereby the suppression of the driven wheel effected by the braking controller is gradually taken over or superseded by the torque controller.

14 Claims, 4 Drawing Sheets (a)

(b)

(a)

(b)

(c)

(d)

WHEEL SPIN CONTROL APPARATUS FOR USE IN AN AUTOMOBILE

BACKGROUND OF THE INVENTION

1. Field of the Invention

The present invention generally relates to a wheel spin control apparatus for use in an automotive vehicle for minimizing the spinning of a driven wheel and, more particularly, to the control apparatus operable to control both the braking force, delivered to the driven wheel, and the engine torque, thereby to quickly and effectively minimize the spinning of the driven wheel of an automotive vehicle which would occur, during, for example, the start or acceleration of the automotive vehicle.

2. Description of the Prior Art

An automotive vehicle usually has at least one pair of driven wheels which are coupled together through a differential gear assembly which is in turn coupled with an engine. It has often been experienced that, when a driver starts or accelerates the automotive vehicle, for example, with a full throttle open, an extremely high engine torque is delivered to the driven wheels so that the drive forces applied to the driven wheels will be greater than the frictional forces between the tires on the driven wheels and the road surface. Accordingly, the driven wheels slip or spin excessively relative to the road surface. An efficient and effective transfer of the wheel traction from the tires to the road surface can be achieved when the speeds of the driven wheels' rotations slightly exceed the vehicle speed with a small amount of spin occurring between the driven wheel tire and the road surface. Thus, the excessive spin results in a loss of the engine power and a reduction of driving efficienty. This is also true even in the case where the automotive vehicle is driven at a moderate engine torque, but starts on a slippery road surface.

As such, numerous wheel spin control apparatuses have previously been suggested for relieving the excessive slip to a value required to achieve the maximum traction, that is, the maximized transfer of a tractive force from the driven wheels onto the road surface. For example, some are designed to apply a braking force to the driven wheel and others are designed to reduce the engine torque in the event that the detection of the wheel speeds indicates incipient spin conditions.

A combined version of these two types is disclosed, for example, in Japanese Laid-open Patent Publication No. 58-16948, laid open to public inspection on Jan. 31, 1983. According to this publication, the wheel spin control apparatus is selectively operable in two modes; the braking control mode and the torque control mode. The braking control mode is brought into effect only when one of the left-hand and right-hand driven wheels tends to spin, so that the braking force can be applied to such one of the driven wheels, thereby to substantially eliminate an unbalanced condition of the driven wheels. On the other hand, the torque control mode is brought into effect when both the left-hand and right-hand driven wheels tend to spin and, also, when one of the driven wheels tends to sping during a high speed driving, so that the engine torque can be reduced. Thus, according to the above described prior art, the braking control mode and the torque control mode are independently performed based on the behavior of the driven wheels.

It is generally known that the response to a control of the braking force is remarkably faster than that of the engine torque. Accordingly, it is desired that the control of the wheel spin by the application of the braking force to the driven wheels is to be effected not only for minimizing the unbalanced condition of the driven wheels, but also for a case when both the left-hand and right-hand driven wheels tend to spin. In the latter case, the braking force should be applied for a length of time required for reducing the torque of the engine, in response to the control under the torque control mode, to a level low enough to alleviate the excessive wheel spin.

However, the control of the wheel spin by the application of the braking force results in the consumption of extra energy for forcibly suppressing the engine. If the system is so arranged as to release the braking control mode as early as possible through a gradual change from the braking control mode to the torque control mode such that the braking control mode is superseded by the torque control mode, the excessive wheel spin could be reduced with less engine power loss. According to the above described prior art, however, the braking control mode and the torque control mode are carried out independently of each other and, therefore, it has been extremely difficult to establish a control system by which the excessive wheel spin can be obviated in dependence on both the braking force and the engine turque.

SUMMARY OF THE INVENTION

Therefore, the present invention has for its essential object to provide an improved automotive wheel spin control operable to control both the braking force, delivered to the driven wheel, and the engine torque, thereby to quickly and effectively minimize the spinning of the driven wheel of an automotive vehicle which would occur, during, for example, the start or acceleration of the automotive vehicle.

According to one feature of the present invention, the braking control is effected based only on the behavior of the driven wheels, so as to relieve the wheel spin to a proper value regardless of whether only one of the left-hand and right-hand driven wheels tends to spin or whether both of them tend to spin.

On the other hand, the torque control is performed in connection with the result of the braking control. In other words, in carrying out the torque control, the magnitude of the braking force produced during the braking control mode is measured or inferred and the engine torque is then controlled by an amount corresponding to the measured or inferred value. It is preferable that while the torque control is performed, reference is made to the behavior of the driven wheels. When the engine torque actually decreases according to the dynamic characteristic of the engine, the excessive wheel spin will be relieved in a quantity corresponding to the reduction of the engine torque. Then, the braking control acts to reduce the braking force, allowing the torque control to supersede the braking control.

In a preferred embodiment of the present invention, a smaller one of the two braking forces applied to the respective left-hand and right-hand driven wheels is used as the measured or inferred value to supersede the braking control with the torque control.

According to the prior art, when the braking force is controlled to a certain magnitude to reduce the excessive wheel spin to an optimum spin so as to produce the maximum traction, such a braking force is maintained at the same magnitude. In such a case, since the torque control is carried out in reference to only the behavior of the driven wheels, no control necessary to permit the torque control to supersede the braking control can be effected.

In contrast thereto, according to the present invention, since the torque control is effected in dependence on the braking control, the braking force once applied for the purpose of reducing the excessive wheel spin is progressively reduced to permit the torque control to supersede the braking control. As a consequence, the wheel spin can be controlled to an optimum value at which the traction can be maximized.

BRIEF DESCRIPTION OF THE DRAWINGS

These and other objects and features of the present invention will become readily understood from the following description taken in conjunction with preferred embodiments thereof with reference to the accompanying drawings, in which.

DETAILED DESCRIPTION OF THE EMBODIMENTS

Figure 1:
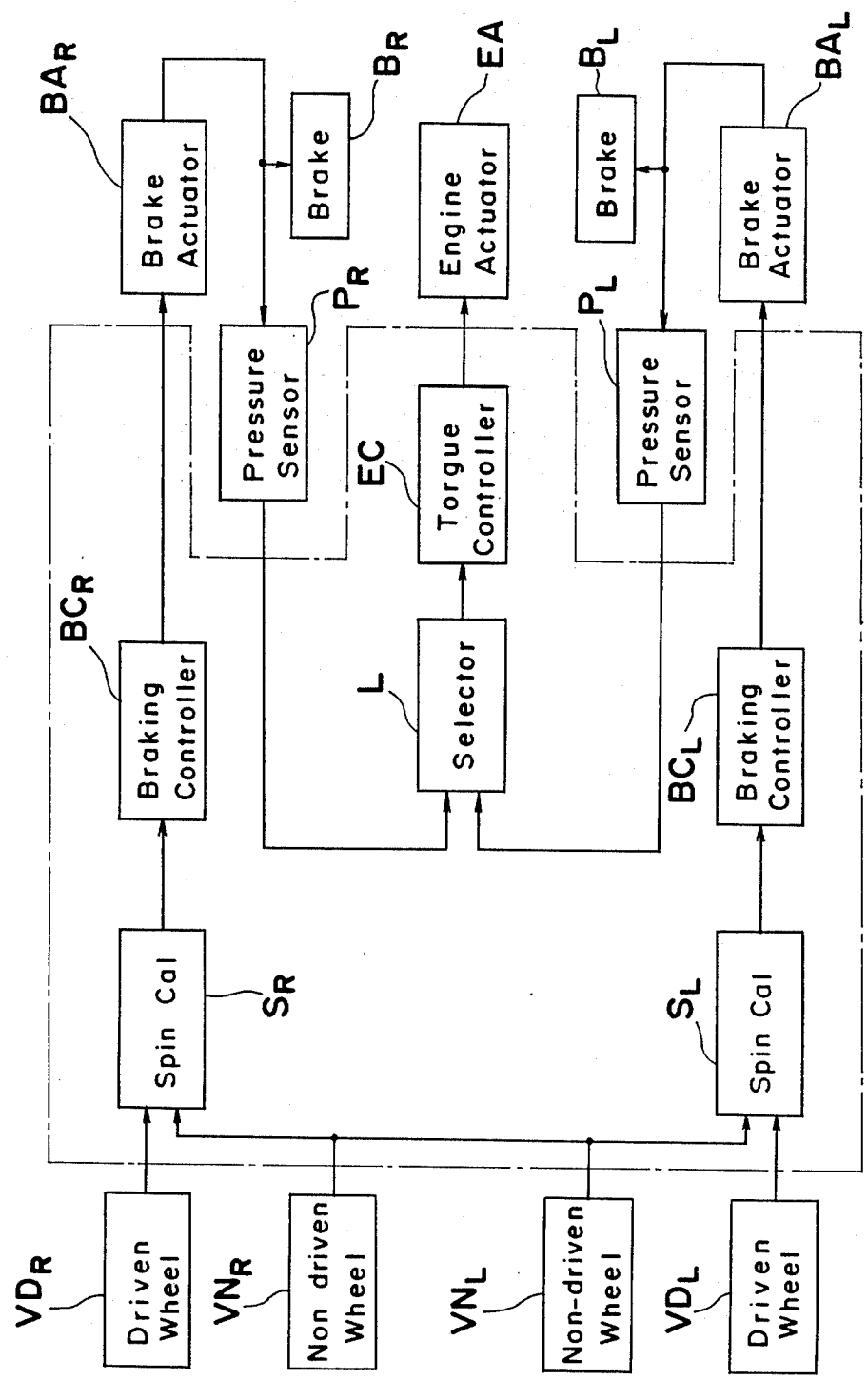
FIG. 1 is a schematic circuit block diagram showing an automotive wheel spin control apparatus according to a first preferred embodiment of the present invention.

Before the description of the present invention proceeds, it is to be noted that like parts are designated by like reference numerals or characters. It is also to be noted that, in describing the present invention, reference is made to an automotive vehicle having a pair of front non-driven wheels and a pair of rear driven wheels.

Referring now to FIG. 1, a wheel spin control apparatus shown therein comprises first and second driven wheel speed sensors $VD_L$ and $VD_R$ for detecting, and generating output signals indicative of, the speeds of rotation of the left-hand and right-hand driven wheels, respectively; first and second non-driven wheel speed sensors $VN_L$ and $VN_R$ for detecting and generating output signals indicative of, the speeds of rotation of the left-hand and right-hand non-driven wheels, respectively; first and second spin output units $S_L$ and $S_R$, each operable to generate a respective spin signal indicative of the amount of spin occurring in the associated driven wheel; and first and second braking controllers $BC_L$ and $BC_R$. Each of the first and second braking controllers $BC_L$ and $BC_R$ is so designed and so operable as to generate a respective first command required to apply or increase the braking force to be applied to an associated wheel brake unit $B_L$ or $B_R$ through an associated brake actuator $BA_L$ and $BA_R$ in the event that the excessively large wheel spin has taken place or is likely to occur and also to generate a respective second command required to reduce or remove the braking force in the event that the wheel spin has become excessively small or is likely to become excessively small.

Each of the brake actuators $BA_L$ and $BA_R$ is operable in response to the first command from the associated brake controller $BC_L$ and $BC_R$ to increase the braking force to be applied to the associated brake unit $B_L$ or $B_R$ and, in response to the second command from the same brake controller $BC_L$ or $BC_R$, to decrease the braking force applied to the associated brake unit $B_L$ or $B_R$.

Each of the spin output units $S_L$ and $S_R$ may be employed in the form of a subtracter operable to calculate a difference in level between the outputs from the wheel speed sensors $VD_L$ and $VN_L$ or between $VD_R$ and $VN_R$, that is, the difference between the speed of rotation of the left-hand driven wheel and that of the left-hand non-driven wheel, or between the speed of rotation of the right-hand driven wheel and that of the right-hand non-driven wheel.

It is to be noted that, although the amount of the wheel spin can be indicated by the difference between the speed of rotation of each of the driven wheels and the vehicle speed (an average value between the speeds of rotation of the left-hand and right-hand non-driven wheels), it is desirable to effect a correction to the amount of wheel spin particularly during the cornering of the automotive vehicle. To this end, the differnece in speed of rotation between the left-hand and right-hand non-driven wheels, or between the right-hand driven wheels and the right-hand non-driven wheels, may be used as a parameter representative of the amount of cornering error. A method of effecting such correction during the cornering of the automotive vehicle is disclosed, for example, in Japanese Patent Application No. 60-201233, filed on Sept. 11, 1985, by the same assignee as the present application.

The wheel spin control apparatus also comprises first and second pressure sensors $P_L$ and $P_R$, the first pressure sensor $P_L$ being operable to detect and generate a first pressure signal indicative of the magnitude of the braking force exerted by the first brake actuator $BA_L$ on the left-hand driven wheel through the brake unit $B_L$. The second pressure sensor $P_R$ is operable to detect and generate a second pressure signal indicative of the magnitude of the braking force exerted by the second brake actuator $BA_R$ on the right-hand driven wheel through the brake unit $B_R$. The first and second pressure signals emerging from the first and second pressure sensors $P_L$ and $P_R$, respectively, are applied to a selector L which compares the first and second pressure signals with each other and applies to a torque controller EC one of the first and second pressure signals which is lower in level than the other of the first and second pressure signals.

The torque controller EC is so arranged to operate in response to the output from the selector L to generate a command necessary to cause an engine actuator EA to increase or decrease the engine torque depending on the signal delivered by the output from the selector L.

While the wheel spin control apparatus according to the first preferred embodiment of the present invention is so constructed as hereinbefore described, the present invention is generally featured in that the control performed by the torque controller EC depends on the first and second pressure signals from the first and second pressure sensors $P_L$ and $P_R$, not on the outputs from the first and second wheel spin output units $S_L$ and $S_R$.

Figure 2:
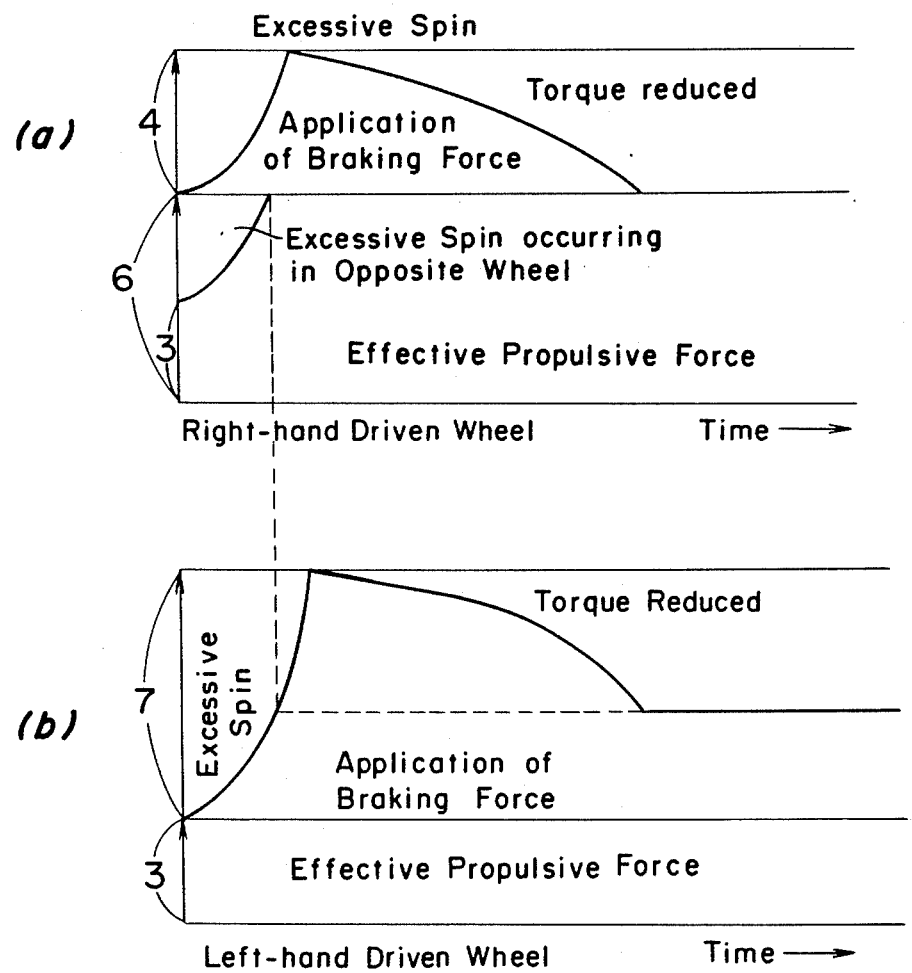
FIG. 2 shows graphs each illustrating the manner in which the excessive wheel spin is alleviated.

Next, the operation of the wheel spin control apparatus described above will now be described with reference to FIG. 2, graphs (a) and (b).

It is now assumed that the automotive vehicle stands still with the left-hand and right-hand driven wheels resting, respectively, on a slippery surface and a normal surface of a roadway. The slippery road surface may be an iced road surface, a snow-covered road surface or a sand-covered road surface and is generally characterized by a relatively low μ (a coefficient of friction relative to the tire and road surface), whereas the normal surface is characterized by a relatively high μ. When a driver of the automotive vehicle depresses an accelerator pedal, both of the driven wheels undergo a moderate spin and the vehicle starts its movement with accelerated velocity appropriate to the slippery road surface. The behavior of the right- and left-hand driven wheels during this condition are illustrated in FIG. 2, graphs (a) and (b), respectively.

It is assumed that the engine torque transmitted to the left-hand driven wheel for a given amount of depression of the accelerator pedal in the automotive vehicle has a power of 10. Similarly, the engine torque transmitted to the right-hand driven wheel has a power of 10. In this case, the left-hand driven wheel on the slippery road surface would move the vehicle with a force (referred to as an effective force) of 3 and would undergo a spinning with a force (referred to as an excessive force) of 7, as shown in FIG. 2, graph (b). On the other hand, the right-hand driven wheel on the normal road surface would move the vehicle with an effective force of 6 and would undergo a spinning with an excessive force of 4, as shown in FIG. 2, graph (a). This is particularly true where the left-hand and right-hand driven wheels are not coupled directly together.

However, since the automotive vehicles usually have a differential gear unit through which the engine torque is distributed to both the left-hand and right-hand driven wheels, the greater effective force of the two driven wheels would be reduced to be equal to the smaller effective force. Therefore, the effective force of the right-hand driven wheel, which ought to be 6, is limited to 3 and the remaining force of 3 would be transmitted through the differential gear unit to the left-hand driven wheel thereby to promote the further spinning of the left-hand driven wheel. Such wheel spins are detected by the respective spin output units $S_L$ and $S_R$. Immediately after the detection by the wheel spins occurring in the left-hand and right-hand driven wheels, the braking controller $BC_L$ and $BC_R$ generate respective output signals which are in turn applied to the associated brake actuators $BA_L$ and $BA_R$ to bring the latter into operation. Accordingly, through the brake units $B_L$ and $B_R$, a braking force of 4 and a braking force of 7 are applied to the right-hand driven wheel and the left-hand driven wheel, respectively, so that the excessive wheel spins occurring in the left-hand and right-hand driven wheels can be alleviated in a short time. During this process, the effective propulsive force of the right-hand driven wheel increases relatively to the increase of the braking force applied to the left-hand driven wheel. When the braking force applied to the left-hand driven wheel attains 3, the right-hand driven wheel could exhibit a propulsive force of 6 appropriate to the friction coefficient μ of the road surface.

The braking force applied to the associated right-hand and left-hand driven wheels are detected by the pressure sensors $P_R$ and $P_L$ which subsequently provides the second and first pressure signals, respectively, said second pressure signal being indicative of the amount of the braking force applied to the right-hand driven wheel and the first pressure signal indicative of the amount of the braking force applied to the left-hand driven wheel.

The first and second pressure signals emerging from the first and second pressure sensors $P_L$ and $P_R$, respectively, are applied to the selector L which compares the first and second pressure signals with each other and selects a lower one of the first and second pressure signals, that is, the second pressure signal in the illustrated instance. The selected pressure signal is applied to the torque controller EC, which, is response to the output from the selector L, generates a command necessary to cause the engine actuator EA to decrease the engine torque. Thus, even though the amount of the depression of the accelerator pedal does not change, the engine torque can be reduced accompanied by the reduction of the wheel spins occurring in the left-hand and right-hand driven wheels, thereby to permit the braking forces to be lowered. The reduction of the engine torque is progressively continued so long as the selector L provides the second pressure signal to the torque controller.

Then, when the selector L no longer produces a pressure signal, the control of the excessive spin occurring in the left-hand driven wheel is based on the control of both the engine torque and the braking force whereas the control of the excessive wheel spin occurring in the right-hand driven wheel is based only on the control of the engine torque.

Thus, according to the present invention, in the event of the occurrence of the excessive wheel spin, the excessive wheel spin can be immediately suppressed or alleviated by the braking force and the engine torque is subsequently reduced, accompanied by the lowering of the braking force. Therefore, it is possible to suppress the excessive wheel spin as quickly as possible and to permit the control of the engine torque to supersede the control of the braking force, thereby to minimize an unnecessary loss of the engine torque.

It is to be noted that, although each of the first and second spin output units, the first and second braking controllers, the selector and the torque controller, all included in a circuit represented by the chain-lined block, may comprise hardware such as shown, a programmable microcomputer may be employed in combination with a software programmed so as to perform a function similar to that done by the circuit represented by the chain-lined block.

Figure 3:
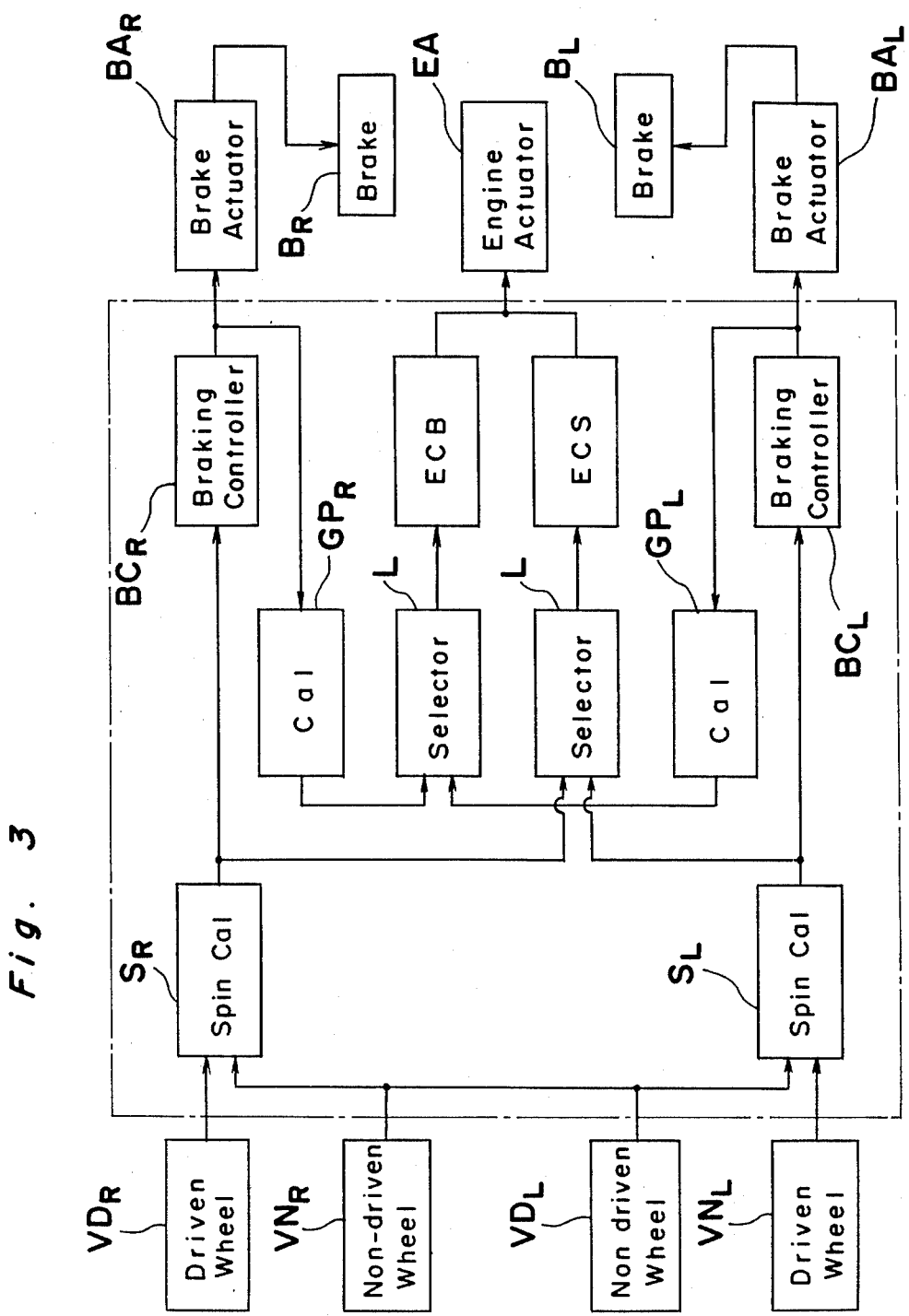
FIG. 3 is a diagram similar to FIG. 1, but showing another preferred embodiment of the present invention.

The wheel spin control apparatus according to another preferred embodiment of the present invention is shown in FIG. 3. The embodiment shown in FIG. 3 differs from that shown in FIG. 1 in that, instead of measuring the braking forces by the pressure sensors, the second embodiment employs calculators $GP_R$ and $GP_L$ to calculate braking forces based on the outputs from the braking controllers $BC_R$ and $BC_L$, respectively, in consideration of the operating characteristics of the associated brake actuators $BA_L$ and $BA_R$. In other words, according to the second embodiment, the braking forces are inferred. Furthermore, the embodiment shown in FIG. 3 differs from that shown in FIG. 1 in that the engine controller EC is divided into a portion ECB which governs the engine control based on the braking force and a portion ECS which governs the engine control based on the behavior of the driven wheels.

The inference of the braking force would reduce the accuracy of operation of the brake actuator BA in a quantity which corresponds to the deviation, and would result in the rough engine torque control. However, such a rough engine torque control will eventually reflect upon the behavior of the driven wheels and can be fed back to the amount of control of the braking force and, therefore, the control will not be extremely deteriorated. Since a device for measuring the braking force or its equivalent braking pressure will result in the increase of the manufacturing cost of the apparatus, the system of inference, which can be embodied by the addition of software, should be attractive.

As will become apparent from the description hereinbelow, it is preferable to have the torque controller EC to receive not only the information representing the braking force which is to be superseded but also information representing the engine torque to be reduced in relation to the speed of rotation of the driven wheels.

The necessity to supersede the braking force is because the dynamic characteristic of the torque control of the engine is slow. Accordingly, in the event of an occurrence of an abrupt increase of the excessive wheel spin, it is desirable that the control with the braking force is first carried out temporarily, followed by the control with the engine torque gradually taking over the control with the braking force. However, under conditions in which the amount of the wheel spin slowly increases from a moderate value to an excessive value, or in which the amount of the wheel spin is within the upper limit of the appropriate range, but stays close to the upper limit for a long period of time, the control should preferably be done only by the engine torque control which is slow in response. Otherwise, if the control is done in combination with the braking force control, there may be undesirable shock which would be imposed on the vehicle when the control with the braking force is introduced. Therefore, under the condition described above, it appears to be feasible to control the engine torque reduction directly in connection with the speed of rotation of the driven wheels. In general, the braking controller BC is preferred to be carried out for controlling a relatively fast change of the spin, and the engine torque control by ECS is preferred to be carried out for controlling a relatively slow change of the spin.

The details of the braking controller BC will now be described.

Assuming that the amount of the spin occurring in one of the driven wheels is $S_1$ and the optimum amount of spin is $S_0$, the excessive amount $X_1$ of spin occurring in such one of the driven wheels can be expressed by the following equation.

$$X_1 = S_1 - S_0$$

It is, however, to be noted that the optimum amount $S_0$ is not fixed, but may take a value generally intermediate between a certain fixed value and a value proportional to the vehicle speed $(VN_1 + VN_2)/2$ and will approach the fixed value at low speed and the value proportional to the vehicle speed at high speed. By way of example, the optimum value $S_0$ can be expressed by the following equation.

$$S_0 = a + b \cdot (VN_1 + VN_2)/2$$

Figure 4:
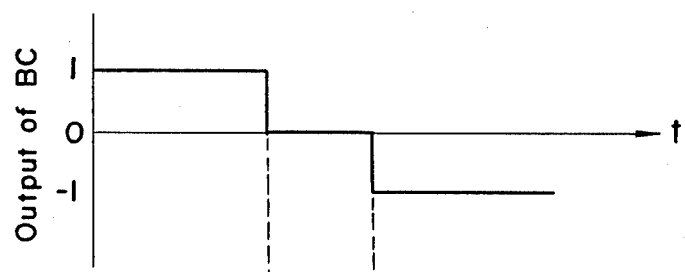
FIGS. 4 and 5 are graphs showing characteristics of a braking controller used in the apparatus.
Figure 4:
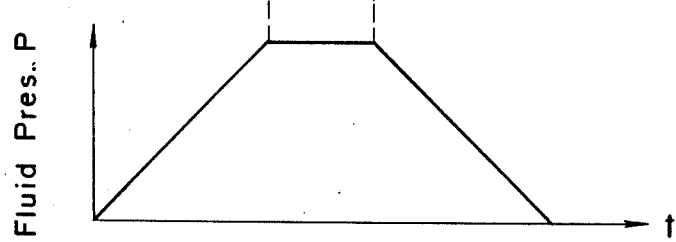

The braking controller BC generates from its output terminal three different signals, that is, "+1", "0" and "−1" signals, as shown in FIG. 4, graph (a). During a period in which the braking controller BC generates the "+1" signal, the fluid pressure in a braking system is increased by a solenoid (not shown) provided in the brake actuator BA to increase the braking force being applied to the associated driven wheel. During a period in which the braking controller BC generates the "0" signal, the fluid pressure is maintained, but during a period in which the braking controller BC generates the "−1" signal, the fluid pressure is reduced to lower the braking force being applied to the associated driven wheel.

The manner in which the signals are processed in the braking controller BC will now be described. After the calculation of the amount of excessive spin $X_1$ as hereinbefore described, the possibility of occurrence of the wheel spin is examined by using the follow equation $Y_1$ which includes a differential $dX_1/dt$ of $X_1$ with time.

$$Y_1 = kX_1 + k'(dX_1/dt)$$

Figure 5:
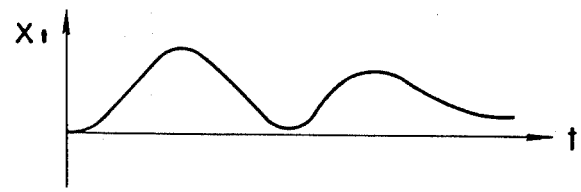
Figure 5:
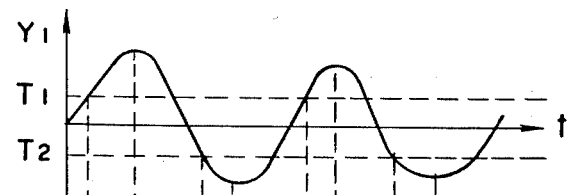
Figure 5:
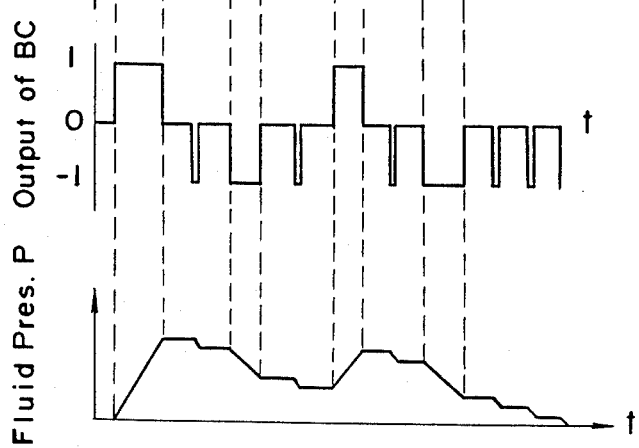
Figure 5:

When the amount of excessive spin $X_1$ is changed as shown in FIG. 5, waveform (a), $Y_1$ changes in a manner shown in FIG. 5, waveform (b). As apparent to those skilled in the art, a peak of $Y_1$ appears before the excessive spin amount $X_1$ attains a peak, because the equation $Y_1$ contains the differential of $X_1$. Thus, by detecting the peak of $Y_1$, it is possible to detect a moment when the wheel spin is likely to occur. When $Y_1$ and two threshold values $T_1$ and $T_2$ are compared and when $Y_1$ exceeds the threshold value $T_1$ in a positive direction, or when $Y_1$ exceeds the threshold value $T_2$ in a negative direction, the braking controller BC generates the "+1" and "−1" signals as shown in FIG. 5, waveform (c). According to one arrangement, the "+1" and "−1" signals can be maintained during when $Y_1$ exceeds the threshold values $T_1$ and $T_2$. According to another arrangement, the "+1" and "−1" signals are terminated when $Y_1$ attains a peak point in the positive or negative direction. The latter arrangement is preferable because any possible overshooting can be avoided and a smooth reduction of the wheel spin can be achieved.

During a period in which neither of the "+1" or "−1" signals is generated, the "0" signal, that is, a hold command, is generated accompanying short pulses of "−1" to effect a moderate reduction of the fluid pressure. This can be accomplished by combining the "−1" signal in the "0" signal in an appropriate spacing. After the command to effect the moderate reduction of the fluid pressure is continued for a predetermined time, the brake fluid pressure is reduced completely to zero, thereby completing the control.

FIG. 5, waveform (d) illustrates a change in braking fluid pressure controlled by the signal shown in FIG. 5, waveform (c).

It is to be noted that the operating characteristic of the brake actuator BA is such that the fluid pressure P will not be reduced lower than zero even when the reduction command "−1" is continuously generated. In other words, the brake actuator BA has such an operating characteristic that P will not become smaller than 0.

In order to accomplish a shift from the braking control mode to the torque control mode at a moderate speed, the frequency of the pulse "−1" within "0" to effect the moderate reduction as hereinbefore described is preferably selected in consideration of the structure of the torque controller and the constants used therein.

The details of the torque controller EC will now be described. It is to be noted that the torque controller EC shown in FIG. 1 has the same structure as ECB shown in FIG. 3.

It is now assumed that the amount of the engine torque to be reduced is E. In order to quickly take over the braking control by the engine control at an amount corresponding to the excessive wheel spin having been temporarily reduced by the control of the braking force applied to the driven wheel, it is necessary to apply a signal to the torque controller so as to make dE/dt depend on the pressure P. For this purpose, it is preferable to control the system to satisfy dE/dt proportional to P. Of course, it is possible to introduce, not a simple proportional relationship, but a suitable functional relationship. When the value of P is zero or substantially zero, or when this condition continues at least to a certain extent, dE/dt should be controlled not equal to zero, but equal to a small negative value; and absolute value of which increases gradually. This is an idea similar to that for gradually reducing the braking pressure by the command applied to the braking controller BC.

The parameter P representing the brake pressure herein used may be either the measured value or the inferred value as hereinbefore described. Where P is inferred, the inferred value and a value dP/dt of the pressure increased per unit of time is used.

Figure 6:
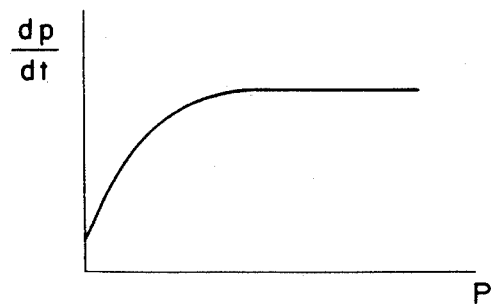
FIG. 6 is a graph showing characteristics of a brake actuator used in the apparatus.

The brake actuator BA may have such an operating characteristic that, depending on the pressure P currently used, dP/dt may vary even when the brake actuator BA receives the same "1" or "−1" signal from the braking controller BC. For example, a case in which the brake actuator BA has received the "+1" command is illustrated in FIG. 6. In such a case, instead of employing the inferred value of $P = (dP/dt) \int Z dt$ with a presumption that dP/dt is a constant value and employing a command value Z (a type of integer which is either one of "+1", "0" or "−1" on a time-series basis), it is preferable to employ the following equation.

$$P_i = P_{i-1} + (dP/dt) \cdot \Delta t$$

In this case, dP/dt is not a constant value and represents the speed of change of the braking pressure determined by the command Z and pressure P, and $\Delta t$ represents a unit of time during which the command Z continues.

The pattern of an output from the torque controller EC depends greatly on what is used for the engine actuator EA. In the case where the engine actuator EA is a type which responds to any one of the "+1", "0" and "−1" signals as similar to the braking actuator BA, the pattern of the output signal from torque controller EC would preferably be a pulse having a controlled pulse with or a controlled pulse density, as shown in FIG. 5, waveform (c).

On the other hand, in the case where the engine actuator EA is a pulse motor of a type wherein the speed can be specified in terms of the pulse rate from outside, the torque controller EC may output dE/dt without modifying it.

The details of ECS will be hereinafter described. One of the characteristic features of ECS lies in that, in contrast to the braking controller BC which controls each of the driven wheels, it controls the engine torque, produced by the automotive engine, in relationship to the smaller one of the wheel spins occurring in the respective driven wheels. As hereinbefore described, it is desirable that ECS is so designed as to be capable of detecting a moderate change as compared with that of the braking controller BC.

Accordingly, in the braking controller BC the differential term plays an important role, but the indifferential term in ECS is of secondary importance. Instead, ECS plays an important role if it has an integrating element, that is, an element for detecting a condition in which a relatively large wheel spin continues for a certain length of time. For this purpose, by rendering a smaller one of $S_1$ and $S_2$ to be SL, and rendering a time in which the excessive spin $XL = SA - S0$ is maintained positive to be T, the following function;

$$YE = kE \cdot XL + kE'(dXL/dt) + kE'' \cdot T$$

may be prepared for the comparison with the threshold value. Also, $S_0$ for the braking controller BC and $S_0$ for ECS can be changed.

If XL is maintained in a negative region as similar to the case with the braking controller BC, E is moderately reduced. In other words, it is necessary to reduce the rate of reduction of the engine power output to rapidly follow the control ordered by the manual operation.

Also, even though the engine actuator EA continues generating a command in which dE/dt is megative as is the case with the brake actuator BA, it is necessary for the engine actuator EA to have such a characteristic that E will not become negative (in which condition the engine torque greater than the produced during the manual operation is produced) after E becomes zero, so that the engine will not produce more power than the manually commanded power.

In the case of the type wherein dE/dt can be inputted as a continuous value as a method of inputting ECB and ECS to the engine actuator EA, it is possible to add respective outputs from ECB and ECS together and apply it to the engine actuator EA.

Where the engine actuator EA is of a type capable of responding to any one of the "+1", "0" and "−1" signals, although it is possible to add the respective outputs from ECB and ECS together and apply it to the engine actuator EA, it is also possible to effect such an addition at a stage preceding the conversion into a pulse width or a pulse density of "+1", "0" and "−1".

Furthermore, it is possible to construct a switching output such that ECB can be outputted when P is a value greater than a certain value, but ECS can be outputted when P is a value smaller than the certain value.

From the foregoing full description of the present invention, it has now become clear that, the present invention is such that the excessive wheel spin is once reduced by controlling the braking force which has a quick response and then controlling the engine torque which has a slow response. Accordingly, by allowing the engine torque control to supersede the braking control, the excessive wheel spin can be quickly alleviated and, at the same time, any possible damage to or loss of energy of various component parts of the automobile power system which would be brought about at the unnecessary braking control can be advantageously avoided.

It is to be noted that the contents of the braking controller BC and the torque controller EC hereinabove described are only for the purpose of illustration and may be varied in any way without departing from the spirit and scope of the present invention.

What is claimed is:

1. A wheel spin control apparatus for a vehicle comprising:
   a driven wheel;

means for applying output power of an engine of said vehicle to drive said driven wheel;

detector means for detecting the occurrence of an excessive wheel spin of said driven wheel of said vehicle;

braking control means for applying a braking force to said driven wheel to suppress said excessive wheel spin is response to the detection of said excessive wheel spin by said detecting means and therafter gradually weakening said braking force; and torque control means for controlling an output power of an engine of said vehicle employed to drive said driven wheel such that said engine output power is gradually decreased as the braking force is gradually weakened so that the suppression of spin of said driven wheel, initially affected by said braking control means, is gradually taken over by said torque control means.

2. A wheel spin control apparatus for an automotive vehicle comprising:

first and second driven wheels;

means for applying output power of an engine of said vehicle to drive said first and second driven wheels;

first detector means for detecting the occurrence of an excessive first wheel spin of said first driven wheel;

first braking control means for applying a first braking force to said first driven wheel to suppress said excessive first wheel spin in response to the detecting of said excessive first wheel spin by said first detecting means and thereafter gradually weakening said first braking force;

second detector means for detecting the occurrence of an excessive second wheel spin in said second driven wheel;

second braking control means for applying a second braking force to said second driven wheel to suppress said excessive second wheel spin in response to the detection of said excessive second wheel spin by said detecting means and thereafter gradually weakening said second braking force;

first selecting means for selecting a smaller one of said first and second braking forces; and torque control means for controlling an output power of an engine of said vehicle employed to drive said first and second driven wheels such that said engine output power is gradually decreased as the braking force selected by said first selecting means is gradually weakened so that the suppression of spin of at least one of said driven wheels, initially affected by said braking control means, is gradually taken over by said torque control means.

3. The control apparatus as claimed in claim 2, further comprising means for measuring the magnitude of each of the braking forces.

4. The control apparatus as claimed in claim 2, further comprising first calculating means and second calculating means for calculating, respectively, the magnitude of the braking forces of said first and second driven wheels in response to the output of a braking control command from said first and second braking control means.

5. The control apparatus as claimed in claim 4, wherein each of said first and second calculating means includes a means for producing a predetermined constant representing a rate of change of the braking force corresponding to the braking command based on the calculated braking pressure then prevailing.

6. The control apparatus as claimed in claim 2, wherein each of said first and second braking control means reduces said first and second braking forces, respectively, after the amount of wheel spin has attained an optimum value.

7. The control means as claimed in claim 2, wherein said torque control means includes means for controlling in accordance with a control mode in which the rate of reduction of the engine power increases relative to the magnitude of the braking force.

8. The control apparatus as claimed in claim 2, wherein said torque control means further includes means for controlling the output power of said engine so that said engine power is gradually increased after said selected braking force becomes equal to or nearly equal to zero.

9. The control apparatus as claimed in claim 2, wherein said torque control means controls the engine based on only said braking forces.

10. The control apparatus as claimed in claim 2, wherein the torque control means includes a first torque control unit which controls the engine based on the braking forces, and a second torque control unit which controls the engine output power based on an excessive wheel spin detected by at least one of said first and second detector. means.

11. The control apparatus as claimed in claim 10, further comprising a second selecting means for selecting a smaller one of said excessive wheel spins detected by said first and second detector means, respectively.

12. The control apparatus as claimed in claim 11, wherein said second torque control unit includes means for controlling the engine based on said excessive wheel spin selected by said second selecting means.

13. The control apparatus as claimed in claim 10, further comprising an averaging means for taking an average of the excessive wheel spins detected by said first and second detector means and wherein said torque control means controls engine power based, at least in part, on an average provided by said averaging means.

14. The control apparatus as claimed in claim 13, wherein said second torque control unit includes means for controlling the engine output power based on said average.

* * * * *